United States Patent [19]

Colburn

[11] Patent Number: 4,599,020
[45] Date of Patent: Jul. 8, 1986

[54] DEBURRING SYSTEM

[75] Inventor: Michael D. Colburn, Mt. Clemens, Mich.

[73] Assignee: Cargill Detroit Corporation, Clawson, Mich.

[21] Appl. No.: 643,435

[22] Filed: Aug. 23, 1984

[51] Int. Cl.[4] .......................................... B23B 51/00
[52] U.S. Cl. ...................................... 408/211; 82/1.2; 408/224
[58] Field of Search ............... 409/138; 408/211, 714, 408/224; 82/1.2, 1.4

[56] References Cited

U.S. PATENT DOCUMENTS 3,195,378 7/1965 Cogsdill ............................... 82/1.2
3,306,136 2/1967 Gosthey ............................... 408/226

OTHER PUBLICATIONS

SKF and Dormer Tools Catalogue Pub. No. SPV 100, Oct. 1977, p. 9.

Primary Examiner—Douglas D. Watts
Attorney, Agent, or Firm—Lloyd M. Forster

[57] ABSTRACT

Automatic backfeed deburring system for holes drilled through non-planar hole end surfaces wherein axially resilient float in the deburring tools accommodate axial variations in the hole burr edges.

8 Claims, 1 Drawing Figure

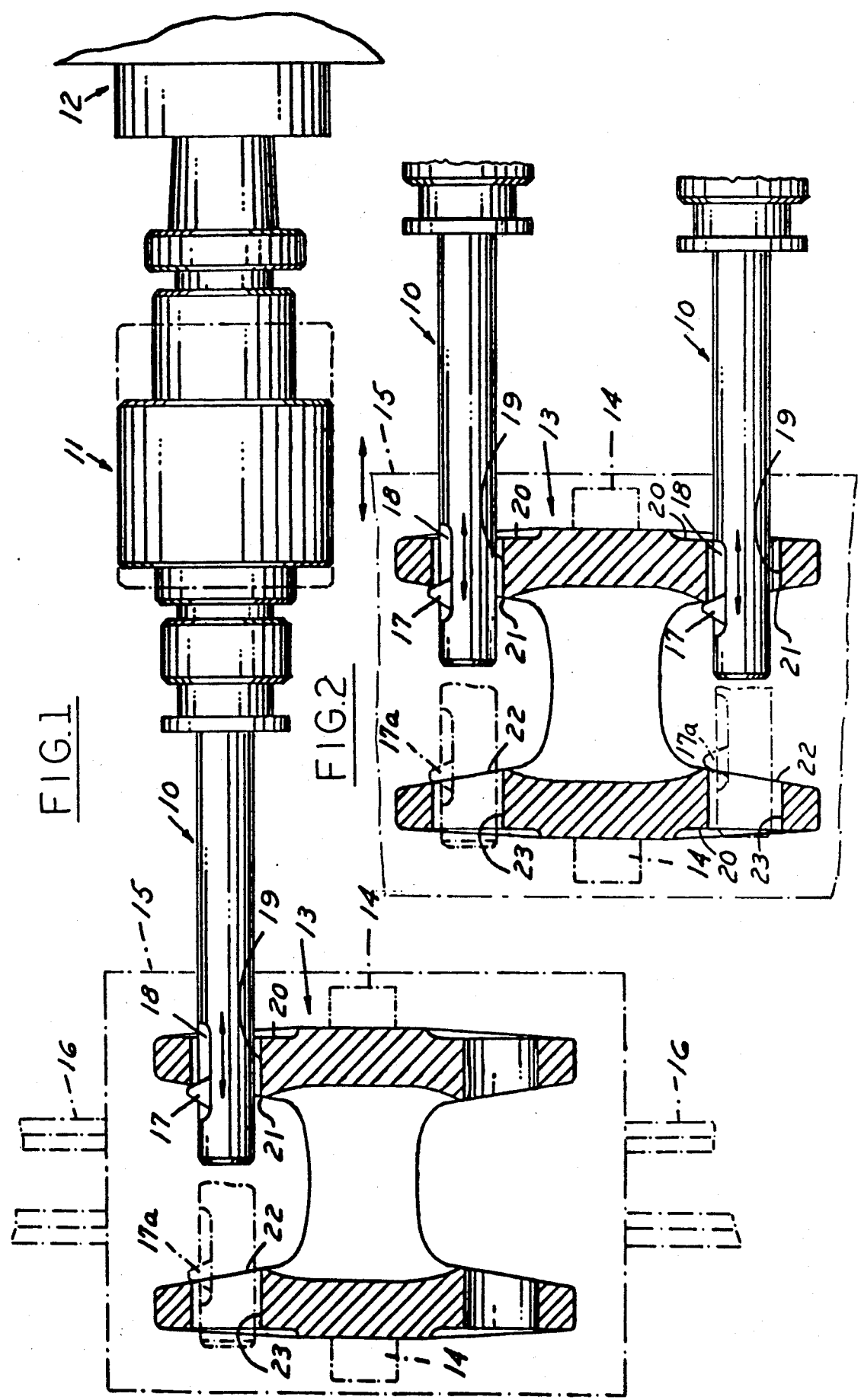

DEBURRING SYSTEM

BACKGROUND OF THE INVENTION

Automatic back feed deburring is known in the art, as in the case of holes drilled through planer surfaces normal to the axis of the drill. In some cases a deburring tool, which may be of a hardened insert type, is spring loaded to automatically retract within the shank of the tool upon insertion through the hole; or in other cases the deburring tool may be actuated through a draw bar or similar mechanism to retract for entry and extend for back feed deburring, normally with a positive feed to a point where deburring at least is completed, and in some cases with a slight chamfer, at which time the tool is withdrawn.

A problem has persisted in holes drilled through workpieces having a forged or otherwise irregular non-planar inner surfaces so that a burr develops from drilling which may vary and project outside of a single plane normal to the axis of the drill. The removal of such burr may be more difficult when it occurs on an enclosed surface such as a hole drilled through a forged yoke involving a through hole with two inside hole edges requiring deburring. State of the art current practice involves manual "snagging" type deburring methods which can accommodate the irregular and inside location of non-planar burr edges which are involved.

SUMMARY OF THE PRESENT INVENTION

Applicant has found that a new combination of devices, each known per se in the prior art, when adapted to provide appropriate force values can be employed to provide automatic deburring previously thought to require manual operations. Thus, by employing a triangular deburring insert, resiliently mounted in a tool shank having a clearance diameter for the hole to be deburred with the resilient spring force appropriate to yield to axial insertion of the deburring tool shank, combined with a tension/compression tap style holder for the tool shank having appropriate axial resilient float to accommodate an irregular contour of the inside face and resulting irregular contour of the hole edge burr, and by rotating such tool at an appropriate speed to accommodate the axial extension and retraction of the insert in following the path of the hole edge to be deburred, an automated system of deburring has become possible. The system will accommodate axial compression deburring, as in the case of deburring the edge of a remote hole in dual through holes of a yoke, as well as tension deburring of the inner edge of the near hole of such yoke.

In some cases the deburring tool shank may be advanced to a fixed axial position for axial compression deburring, with resilient float of the holder accommodating the contour path of the hole edge, as well as a fixed position for tension deburring of the near hole, similarly relying on resilient tension in the holder for accommodating the contoured hole edge path. Any need for a fine precision lead for feed in either axial direction, or for precision bearings for the shank holder, is thereby avoided since resiliency in the total system of axial shank compression and tension and radial insert yieldable mounting is such as to require only provision of appropriate axial stop positions for respective compression and tension deburring operations.

With such system it has been found possible to automatically deburr four holes in an integral double yoke construction, such as involved in a forged universal joint blank having contoured inner forged surfaces through which two pairs of axially aligned holes are drilled, at a deburring station where a dual spindle head simultaneously advances the dual spindles through the near holes to first deburr the irregular face hole edge contour of the two remote holes followed by retraction to a position for deburring the irregular face hole edge contour of the near holes followed by withdrawal of the tool, thus effecting single pass deburring of four holes at a single deburring station.

BRIEF DESCRIPTION OF THE DRAWING

The single FIGURE is a plan view illustrating the deburring tool in back feed deburring relation with the workpiece.

DESCRIPTION OF THE PREFERRED EMBODIMENT

With reference to the drawing, a combination of standard tooling components includes a Cogsdill "Burraway" deburring tool 10, such as illustrated in Cogsdill's commercial CATALOG 100 and U.S. Pat. No. 3,306,136; a Valenite "S.P.V." SA-1E tap driver 11, such as illustrated in Publication No. S.P.V. 100 dated October, 1977 and currently distributed by SKF and Dormer Tools, P.O. Box SKF, Trumbull, Conn. 06611, and spindle 12 of a standard machine tool having a numerically controlled axial slide (not shown) as known in the art. At any given axial position of spindle 12 and the shank of tap driver 11 engaging and driven by such spindle, the enlarged collar of tap driver 11 and its shank having tool holder for deburring tool 10 are capable of axial resilient float, as indicated by arrows within the limits of phantom lines shown for the collar. In tension mode with spindle 12 retracted to the position shown and deburring tool 17 engaging axially variable hole 21, the float of tap driver 11 is partially used up, as shown, to maintain deburring tool 10 in tension while following the axial deviation of hole 21. When spindle 12 is advanced to move deburring tool 10 to the phantom position shown for blade 17a, the float of tap driver 11 will be partially used up in the opposite direction to maintain deburring tool 10 in compression while blade 17a follows the axial deviation of hole 22. Tooling components are shown in deburring relation with typical workpiece 13 comprising a four hole double yoke forged universal joint blank mounted, as schematically shown, with suitable clamp 14 on pallet 15 advanced by conveyor 16 to a station including the deburring unit where the pallet is accurately located and rigidly held by suitable means known in the art.

Deburring tool 10 is equipped with blade 17 resiliently mounted to depress within slot 18 in passing through workpiece hole 19 upon axial advance of spindle 12 after compressing tension/compression tap style holder 11 to a limit stop upon engagement of blade 17 with entering hole edge 20 and after the relatively larger radial resilient resistance of blade 17 is overcome to pass through hole 19.

Upon complete passage, blade 17 springs back to deburring position and retraction of spindle 12 to a tension stage of holder 11 to accommodate a resilient deburring stroke over the axially variable hole edge 21 under the tension loading of holder 11 which is adapted with a sufficiently light spring rate to yield without causing radially inward deflection of deburring blade 17.

In a similar manner axially irregular hole edge 22 in aligned hole 23 may be deburred by advancing spindle 12 to a compression mode of holder 11 accommodating axial deflection of blade 17a with the deburring tool advanced to the phantom position illustrated.

In a preferred automatic cycle for deburring both holes 19 and 23 in a single station sequence of operations, spindle 12 will be programmed to advance first to the compression mode of deburring at hole 23 corresponding with the phantom illustration of the deburring tool, the spindle remaining in a single fixed position while burring tool 10 oscillates resiliently within holder 11 to complete deburring of hole edge 22, followed by retraction of spindle 12 to a second fixed position for accommodating oscillation of burring tool 10 under tension to complete the deburring of hole edge 21, followed by full retraction of spindle 12 to withdraw the deburring tool from hole 19.

There are several possibilities for automatically deburring the second pair of holes in the illustrated workpiece; for example pallet 15 may be relocated relative to the axis of the deburring tool for a repeat operation on the second pair of holes; or the pallet may move to a second station having duplicate deburring tooling; or duplicate deburring tooling may be provided on a common dual spindle machine tool wherein a single slide for a pair of spindles 12 can simultaneously advance both sets of deburring tooling for simultaneous operations.

From the foregoing description it will be understood that relatively simple controls are involved in effecting automatic deburring over an irregular axially variable hole edge wherein the tension/compression float in tap style holder 11 between end stops may be proportioned to somewhat exceed the axial variation of hole edge in either the tension or compression mode, and with a sufficiently light spring rate to cover the range of axial variation without radially displacing deburring blade 17. The axial positioning of spindle 12 is thereby reduced to a simple semi-precision, dual operating position control where light compression or tension will extend over the entire irregular edge to be deburred. Thus, neither precision positioning nor precision feed is involved, and a mere provision of appropriate spring rate for axial float relative to the higher spring rate for radial blade deflection is required to make the system completely satisfactory in operation.

I claim:

1. Deburring system comprising deburring station having rotary head with means for axial positioning displacement, first tool shank mounted within said head having tool holder with axially resilient axial tool holding means, deburring tool shank in said tool holder capable of resilient axial displacement when said first tool shank is at a fixed axial position, deburring means in the end of said deburring tool shank radially displaceable therein with means for producing radial retraction during entry and passage through a drilled workpiece hole and radial extension to a deburring position upon completing passage through said hole, said hole having an irregular edge to be deburred extending outside of a plane normal to the hole axis, said deburring means having a deburring edge for reacting axially at the edge of said workpiece hole against the resilient bias of said tool holding means to produce axial displacement in either direction of said deburring tool shank to accommodate continuous deburring hole engagement while following an axially varying hole edge path during deburring rotation of said shanks.

2. Deburring system of claim 1 wherein said deburring means at the end of said deburring tool shank comprises resiliently radially displaceable deburring means biased to outer deburring position and resiliently displaceable to hole passage radial retraction.

3. Deburring system of claim 2 wherein said deburring edge extends at an intermediate angle between said axis and right angle providing a substantial component of radial to axial displacement relative to a fixed reaction point.

4. Deburring system of claim 3 wherein said angle engagement of workpiece hole edge produces radially inward reaction force responsive to axial displacement, the relative radial and axial resilient bias permitting said radial bias to predominate during deburring engagement while said first shank is held in fixed axial position.

5. Deburring system of claim 4 including resilient axial displacement limit means for said deburring tool shank holding means, said radial bias yielding to accommodate hole passage retraction upon axial displacement of said first tool shank to pass the resilient limit position of said deburring tool shank holding means.

6. Deburring system of claim 5 including compression/tension resilient axial deburring tool shank holding means, said deburring means having dual angularly related deburring edges adapted respectively for deburring under either compression or tension displacement of said deburring tool shank holding means.

7. Deburring system of claim 6 including means for deburring facing edges of axially aligned spaced holes in a workpiece wherein said first tool shank is initially advanced to move said deburring means through one hole into compression deburring relation with the other hole, followed by retraction of said first tool shank to a tension deburring position relative to said first hole, and final complete retraction.

8. Deburring system of claim 7 for a workpiece having two pairs of parallel aligned holes, each with facing hole edges extending out of right angle planes to the hole axes, said deburring station having dual rotary heads with parallel axes spaced equally to the spacing of said workpiece hole axes, each of said heads being equipped for deburring, including means for positioning the workpiece with hole axes in parallel alignment with the axes of said dual heads so that deburring of all four facing hole edges may be accomplished through a single reciprocation of said dual rotary heads.

* * * * *